United States Patent [19]

Morita et al.

[11] 4,071,958
[45] Feb. 7, 1978

[54] DEVICE FOR INSPECTING INNER DIAMETER AND BENDING OF PIPE

[75] Inventors: Kazuo Morita, Aichi; Seiichi Asano; Shigeharu Masuma, both of Handa, all of Japan

[73] Assignees: Aichi Steel Works, Limited; Kawasaki Steel Corporation, Kobe, both of Japan

[21] Appl. No.: 672,956

[22] Filed: Apr. 2, 1976

[30] Foreign Application Priority Data

Apr. 4, 1975 Japan .................................. 50-45416
Mar. 8, 1976 Japan .................................. 51-27246

[51] Int. Cl.² ........................... G01B 3/46; G01B 5/12
[52] U.S. Cl. ............................. 33/178 B; 33/DIG. 2; 209/82
[58] Field of Search ....................... 33/178 B, DIG. 2; 73/37.9; 209/82

[56] References Cited

U.S. PATENT DOCUMENTS

| 1,239,532 | 9/1917 | Sponsel | 33/178 B |
| 1,919,546 | 7/1933 | Fletcher | 33/178 B |
| 2,355,280 | 8/1944 | Dichter | 209/82 |

FOREIGN PATENT DOCUMENTS

| 224,554 | 4/1962 | Germany | 209/82 |

Primary Examiner—Richard E. Aegerter
Assistant Examiner—Richard R. Stearns
Attorney, Agent, or Firm—Karl W. Flocks

[57] ABSTRACT

The present invention discloses a device for automatically inspecting the acceptability of the inner diameter and bending of pipes of the type in which a cylindrical gage is inserted and forced to pass through the pipe to be inspected under the driving force of, for instance, compressed air. The pipe through which the gage passes from one end thereof to the other end is accepted, but the pipe in which the gage is stopped is rejected together with the gage. A pipe to be inspected is located by positioning first and/or second pipe positioning means into a predetermined pipe inspection position, and then firmly clamped by pipe clamping means. A cylindrical gage with a predetermined outer diameter and length is brought to the firing position by gage positioning means, inserted into one end of the pipe and forced to pass through the pipe under the compressed force admitted into the pipe behind the gage through gage firing means. The gage discharged out of the other end of the pipe is trapped by gage recovery means and discharged onto a conveyor system which returns the gage to the gage positioning means for the next inspection, and the inspected pipe is automatically released from the inspection position and discharged out of the pipe inspection device. Thus the full-automatic, safeguarded and quick pipe inspection may be ensured.

9 Claims, 13 Drawing Figures

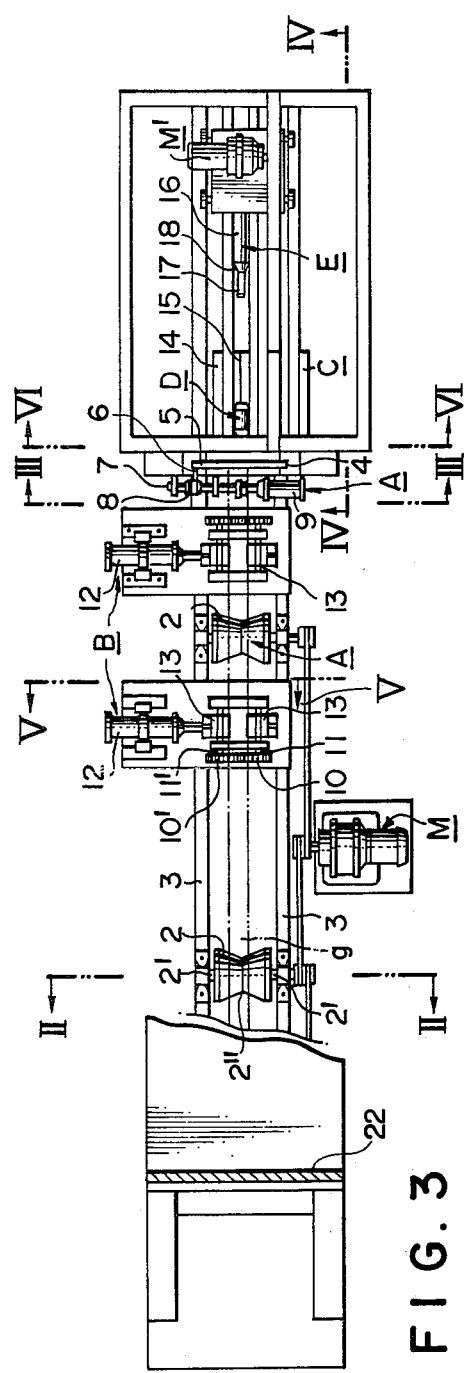
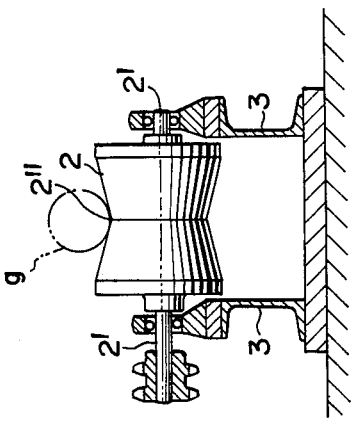
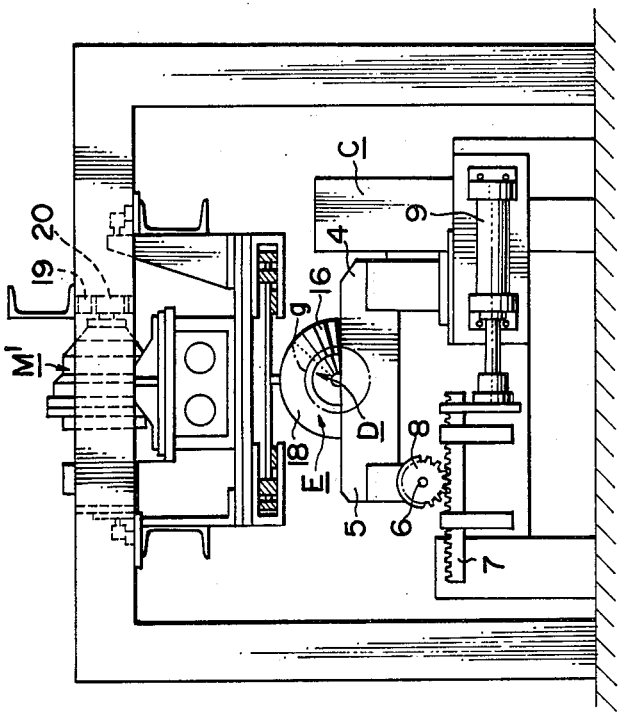

DEVICE FOR INSPECTING INNER DIAMETER AND BENDING OF PIPE

BACKGROUND OF THE INVENTION

The present invention relates to an automatic pipe inspection system for inspecting the acceptability of the inner diameter and bending of pipes of the type in which a cylindrical gage is inserted into one end of a pipe to be inspected and forced to pass therethrough to the other end thereof under the driving force of the fluid under pressure so that the pipe through which the gage has passed is passed through inspection while the pipe through which the gage cannot pass is rejected with the gage stopped therein.

In one of the conventional methods for inspecting the acceptability of the inner diameter and bending of pipes, a rope or the like having one end attached to a gage is manually inserted through a pipe to be inspected from one end thereof and is pulled out of the other end of the pipe to pass the gage therethrough. With the increase in length of recently manufactured pipes, the wire having a length longer than that of a pipe to be inspected must be prepared, and consequently it takes a relatively long time for an inspector to insert the wire through the pipe so that the quick pipe inspection cannot be accomplished.

In another conventional method, a rod with a gage attached to one end thereof is driven mechanically to pass through a pipe to be inspected. Therefore the rod again must be longer in length than a pipe to be inspected, and the rod must be inserted into the pipe from one end thereof, pulled out of the other end and then returned to the initial position. In addition, a relatively large pipe inspection area is required because of a relatively large space required for installation of the device for supporting a pipe to be inspected and driving the rod with the gage through the pipe.

In a further conventional method, a gage is inserted into the pipe to be inspected from one end thereof, and then an air gun is inserted into one end of the pipe to admit the air under pressure behind the gage in the pipe, thereby forcing the gage through the pipe toward the other end thereof. However to carry out this inspection method, skilled laborers are required because only they can safely handle the portable air gun to fire the gage through the pipe. This operation is apparently too dangerous for unskilled laborers. In addition, they must precisely locate the gage and the air gun in inspection position which is different for each pipe to be inspected. Furthermore, this method requires an additional laborer who stands at the other end of a pipe to be inspected to place a stopper at the other end of the pipe so that the gage may be prevented from being shot out of the pipe. This laborer must change his position depending upon the length of a pipe to be inspected. Moreover his operation must be precisely synchronized with the operation of the air gun operator so that the gage shot out of the pipe will never hit him and any other equipment thereabout. When the gage strikes against an object, it will be inevitably deformed or damaged and cannot be used for further inspections. Even though the above pipe inspection method for firing the gage through a pipe to be inspected is mechanized to some extent, it still requires manual operations. Therefore the pipe inspection is considerably dependent upon the experience and skill of the inspectors, and consequently the inspection efficiency in terms of the number of pipes inspected per man is relatively low. Furthermore, the above method cannot provide a fully safeguarded pipe inspection so that the inspectors and equipment therearound will have no fear that they may be hit by the flying gage.

In view of the above, one of the objects of the present invention is to eliminate the above and other problems encountered in the conventional pipe inspection methods and devices.

Another object of the present invention is to provide a fully mechanized or automated pipe inspection device which may accomplish the rapid pipe inspection, thus increasing the pipe inspection efficiency in terms of the number of pipes inspected per man, may ensure a fully safeguarded operation even by unskilled laborers eliminating the accident of the gage being shot out of the pipe and hitting the inspectors and equipment, may attain economy of laborers and may minimize the damage to the gage, thereby ensuring a long service life thereof.

The pipes to be inspected vary in diameter and length over a wide range. Therefore a pipe inspection device must accomplish a rapid yet fully safeguarded inspection regardless of the experience and the degree of skill of the laborers.

A further object of the present invention is therefore to provide a pipe inspection device which may accomplish a rapid and reliable pipe inspection regardless of the change in diameter and length of pipes to be inspected, that is, the pipe inspection device being suitably adjusted within a short time depending upon the size of a pipe to be inspected, whereby the pipe inspection efficiency may be remarkably improved.

A further object of the present invention is to provide an improved automatic pipe inspection device in which a gage which is discharged out of the other end of a pipe may be automatically and quickly returned to the firing position for the next inspection so as to be automatically inserted into the next pipe to be inspected.

BRIEF DESCRIPTION OF THE DRAWING

FIG. 1 is a top view of a first embodiment in accordance with the present invention;

FIG. 2 is a side view, partly in section, looking into the direction indicated by the arrows II—II of FIG. 1;

FIG. 3 is a side view looking into the direction indicated by the arrows III—III of FIG. 1;

DESCRIPTION OF THE PREFERRED EMBODIMENTS

First Embodiment, FIGS. 1 through 8

Figure 4:
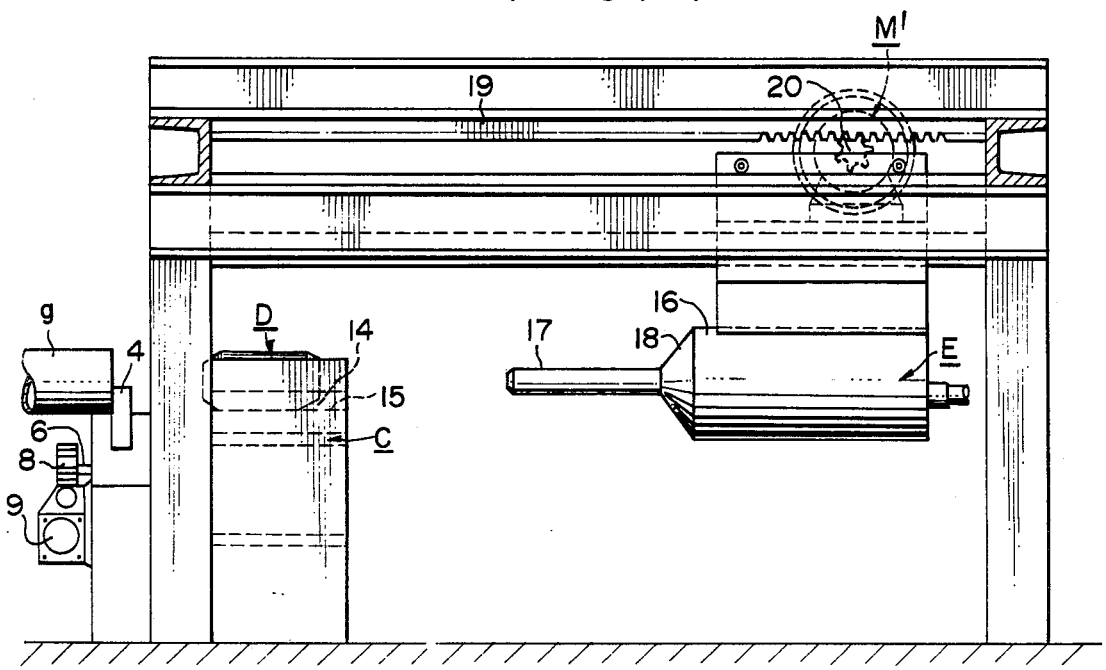
FIG. 4 is a front view looking into the direction indicated by the arrows IV—IV of FIG. 1.

In FIG. 1 there is shown in top view a first embodiment of a pipe inspection device for acceptability inspection of the inner diameter and bending of a pipe, comprising in general a pipe positioning device A, a pipe clamping device B, a gage positioning device C, a gage D and a device E for inserting the gage D into a pipe to be inspected and forcing it through the pipe.

Pipe Positioning Device A, FIGS. 1, 2 and 3

The pipe positioning device A comprises, as shown in FIGS. 1 and 2, concave rollers 2 each carried by a shaft 2' which in turn is rotatably supported on stands 3, an electric motor M drivingly coupled to the rollers 2 for driving the same, and a stopper 4 whose one end or base 5 is carried by a shaft 6 which also carries a pinion 8 in mesh with a rack 7 which is located adjacent to one of the stands 3 and is drivingly coupled to an air cylinder 9 (See FIGS. 1 and 3) so that the stopper 4 may rotate through a predetermined angle about the shaft 6 in a vertical plane in parallel with the axis of the shaft 2' of the concave roller 2.

Figure 5:
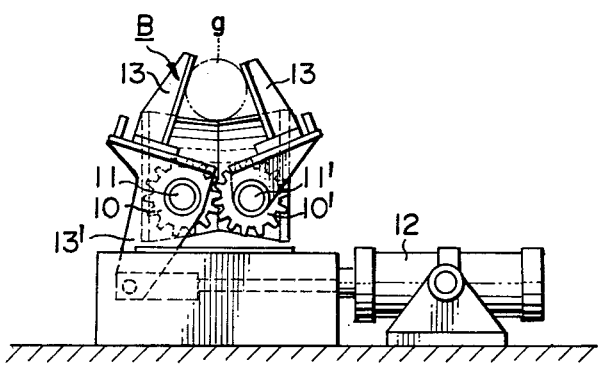
FIG. 5 is a side view looking into the direction indicated by the arrows V—V of FIG. 1.

The Pipe Clamping Device B, FIGS. 1 and 5

As shown in FIGS. 1 and 5, the pipe clamping device B in the first embodiment is of the chuck type comprising gears 10 and 10' which are carried by rotary shafts 11 and 11', respectively, and are in mesh with each other, a lever arm 13' whose lower end is pivoted to the piston rod of an air cylinder 12 and whose upper end portion is securely attached to one end of the rotary shaft 11, and a pair of clamping arms 13 carried by the rotary shafts 11 and 11'. The extension of the piston rod of the air cylinder 12 causes the gear 10 and hence the shaft 11 to rotate in the clockwise direction so that the gear 10' in mesh with the gear 10 and hence the shaft 11' are caused to rotate in the counterclockwise direction and consequently the clamping arms 13 are moved toward each other to clamp a pipe therebetween as best shown in FIG. 5. On the other hand, when the piston rod of the air cylinder 12 is retracted, the clamping arms 13 are moved away from each other to release the pipe from the locked or clamped state.

Figure 6:
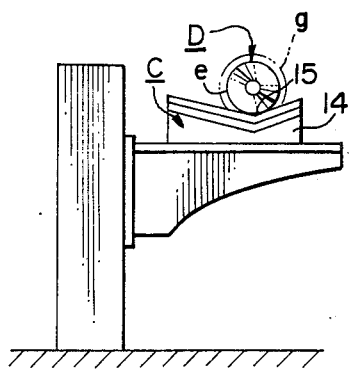
FIG. 6 is a side view looking into the direction indicated by the arrows VI—VI of FIG. 1.

Gage Positioning Device C, FIGS. 1 and 6

As shown in FIGS. 1 and 6, the gage positioning device C comprises a V-block 14 disposed adjacent to the stopper 4 and provided with a V-shaped groove 15 which is extended in parallel with the axis of a pipe placed upon the rollers 2 and clamped.

Figure 7:
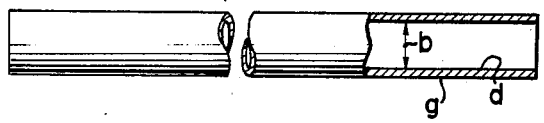
FIG. 7 is a side view, partly broken, of a pipe to be inspected.
Figure 8:
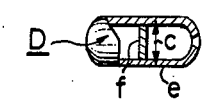
FIG. 8 is a side view, partly broken, of a gage.

Gage D, FIGS. 7 and 8

The gage D consists of a hollow cylindrical member made of a metal as best shown in FIG. 8. The outer diameter C of the gage D is selected slightly smaller than the inner diameter $b$ of a pipe $g$ to be inspected (See FIG. 7), and the side wall $e$ of the gage D is formed coaxial of the inner wall surface $d$ of the pipe $g$. The inside of the gage D is divided into two chambers by a partition wall $f$ located at the midpoint between the bases of the gage D (See FIG. 8).

Device E for Inserting the gage D into the Pipe and Passing It Therethrough, FIGS. 1, 3 and 4

As shown in FIGS. 1, 3 and 4, the device E for inserting the gage D into the pipe $g$ and passing it therethrough (which device shall be referred to as "the gage injecting or firing device E" for brevity hereinafter in this specification) comprises an air nozzle 16 whose one end (the left end in FIG. 4) terminates into a reduced-diameter section 17 whose outer diameter is smaller than the inner diameter $b$ of the pipe $g$ to be inspected and which is connected through a tapered section 18 to the large-diameter section of the air nozzle 16. In operation, the tapered section 18 is made into tight contact with one end of the pipe $g$, thereby air-tightly sealing the pipe $g$. The air nozzle 16 is suspended from a driving mechanism consisting of a pinion 20 in mesh with a rack 19 and drivingly coupled to an electric motor M' so that the air nozzle 16 may be displaced along the axis of the pipe $g$ placed on the rollers 2 and clamped in the inspection position.

Stopper Plate 22, FIG. 1

As shown in FIG. 1, an upright stopper plate 22 is attached to the stands 3 in opposed relation with the stopper 4 and spaced apart therefrom by a suitable distance.

Next the mode of operation of the first embodiment with the above construction will be described hereinafter. The pipe $g$ which is transported by a suitable loading conveyor system or the like (not shown) is placed on the rollers 2, and because the contact surface of the roller 2 is tapered as best shown in FIG. 2, the pipe $g$ immediately resets on the rollers 2 with the axis of the pipe $g$ in parallel with the center line 2" of the roller 2 as best shown in FIG. 2. Thereafter, the motor M is energized to drive the rollers 2 in the clockwise direction in FIG. 1 until one end (the right end in FIG. 1) of the pipe $g$ strikes against the stopper 4 which is previously located in the operative position (shown in FIG. 1) by its driving mechanism consisting of the rack 7, the pinion 8 and the air cylinder 9. Then the motor M is de-energized. That is, the pipe $g$ is placed at a predetermined inspection position. Next the air cylinder 12 is actuated to extend its piston rod so that the clamping arms 13 are moved toward each other, thereby clamping the pipe $g$ securely in the inspection position as shown in FIG. 5 in the manner described above. Thereafter, the driving mechanism of the stopper 4 is so actuated that the stopper 4 is rotated in the counterclockwise direction about the shaft 6 as shown in FIG. 3 and moved away from one end of the pipe $g$, thereby permitting the gage D to be inserted into the pipe $g$.

Meanwhile the gage D adapted to inspect this pipe is placed in the V-shaped groove 15 of the block 14. The motor M' is energized so that the reduced-diameter section 17 of the air nozzle 16 moves toward the end of the gage D, pushing it into the pipe $g$ from one end thereof. As the air nozzle 16 is further inserted into the pipe $g$, the tapered section 18 thereof makes into very intimate fluid-tight contact with one end of the pipe. Thereafter the fluid under pressure such as compressed air is injected through the air nozzle 16 into the pipe $g$ behind the gage D so that the fluid under pressure strikes against the partition wall $f$ in the gage D, forcing it to pass through the pipe toward the other end thereof. The gage D is shot or discharged out of the other end of the pipe $g$, strikes against the stopper plate 22 and drops upon a bed between the stands 3 to be recovered for the next inspection. The inspected pipe g is discharged out of the rollers 2 by suitable unloading means (not shown).

In a like manner, the next pipe to be inspected is placed on the rollers, and is inspected to determine the acceptability; that is, the inner diameter and bending. When the gage D cannot pass through the pipe under the driving force of the fluid under pressure, both the pipe and the gage are rejected.

As described above, according to the first embodiment the automatic inspecton of the inner diameter and bending of a pipe can be carried out so that considerable labor saving may be attained. Furthermore rapid and fully safeguarded pipe inspection may be ensured because the gage can be automatically and positively inserted into a pipe to be inspected and fired therethrough and the gage that is shot or discharged out of the pipe strikes against the stopper plate 22, dissipating its kinetic energy and dropping it upon the bed for recovery so that the gage will never hit against an inspector at the other end of the pipe and equipment therearound.

Second Embodiment, FIGS. 9 through 13

The second embodiment shown in FIGS. 9 through 13 is an improvement of the first embodiment described above with reference to FIGS. 1 through 8 so that the novel features of the first embodiment may be more enhanced. That is, the second embodiment further includes a system for automatically charging a pipe into the pipe inspection device and discharging the inspected pipe therefrom; a system for safely and positively receiving the gage ejected out of the other end of the pipe and automatically returning it to the initial position for the next inspection; and means for adjusting the pipe inspection device depending upon the inner diameter and length of pipes to be inspected.

A particular advantage of the second embodiment over the first embodiment resides in the fact that the automation of the second embodiment is more extensive than the first embodiment. As a result, the pipe inspection efficiency may be remarkably improved, a fully safeguarded and reliable inspection may be carried out regardless of the experience and the degree of skill of laborers, economy of labor may be realized, and the gage may be prevented from flying beyond and over a predetermined path and consequently the damage to the gage may be eliminated.

Figure 9:
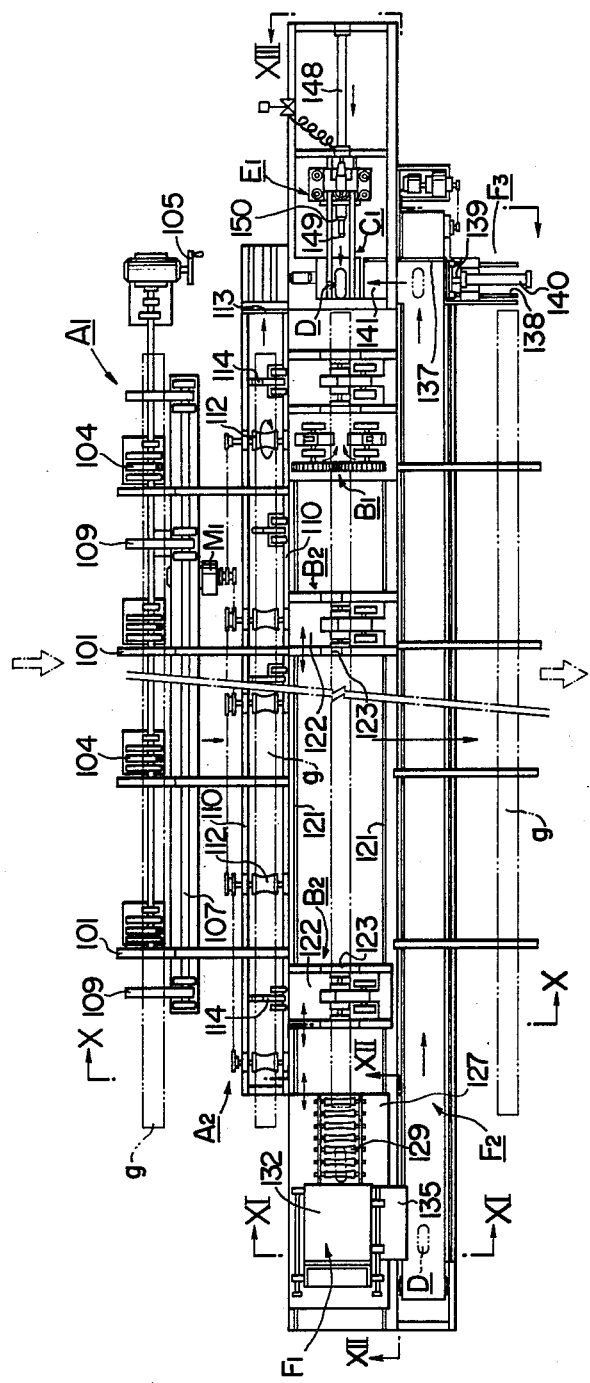
FIG. 9 is a top view of a second embodiment in accordance with the present invention.

The second embodiment is shown in top view in FIG. 9, comprising in general a pipe charging device $A_1$, a device $A_2$ for locating one end of the pipe to be inspected at a predetermined position, a pipe clamping device $B_1$, a pipe positioning device $B_2$, a gage recovery box $F_1$, a gage conveyor system $F_2$ including a discharging device $F_3$, a gage positioning device $C_1$ and a gage injecting or firing device $E_1$.

Figure 10:
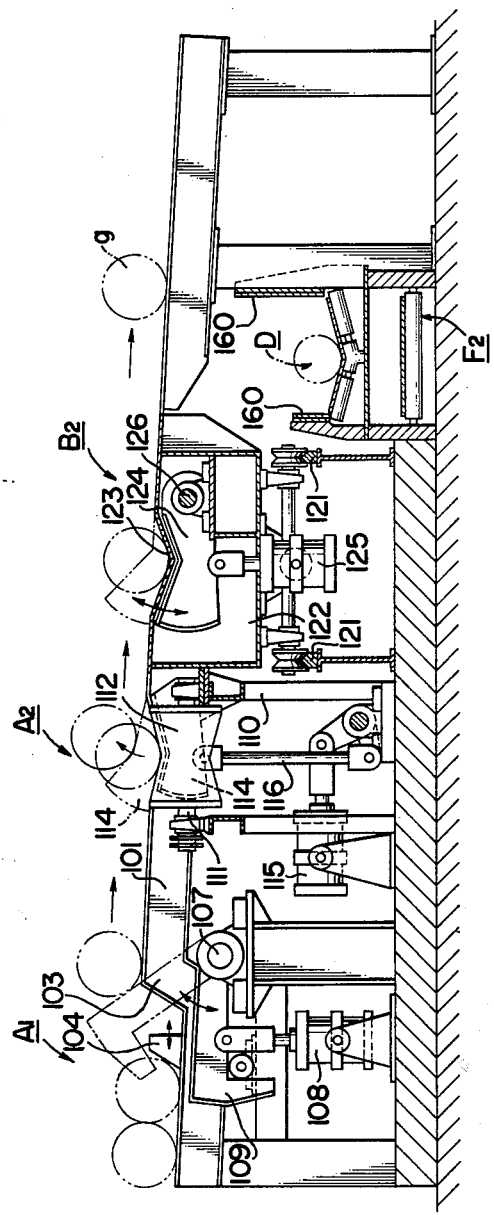
FIG. 10 is a side view looking into the direction indicated by the arrows X—X of FIG. 9.

The pipe charging or transfer device $A_1$ disposed along one side of the pipe inspection device comprises in general a plurality of transfer stands 101 with stoppers 104 which are spaced apart from each other by a suitable distance in the longitudinal direction, and a plurality of shift devices also spaced apart by a suitable distance from each other in the longitudinal direction. As best shown in FIG. 10, each transfer stand 101 is of the skid type for rolling down a pipe to the right in FIG. 10 and has an outer lower rolling surface inclined downwardly inwardly, an inner upper rolling surface inclined downwardly inwardly and a stepped portion 103 interconnecting between the inner upper and outer lower rolling surfaces.

The stoppers 104 of the transfer stands 101 are operatively coupled through suitable coupling means (not shown) to a common handlewheel 105 (See FIG. 9) so that they may be transversely displaced in the directions indicated by the arrow in FIG. 10 for the purpose to be described hereinafter.

Each shift device comprises a first shift arm 109 whose base is carried by a shaft 107, and an air cylinder 108 whose piston rod is connected to the first shift arm 109 at the midpoint between its base and free end. Therefore the first shift arm 109 may swing through a predetermined angle in a plane perpendicular to the axis of the pipe inspection device as the piston rod of the air cylinder 108 is extended or retracted.

The pipe end aligning device $A_2$ comprises in general a plurality of concave rollers 112 which are spaced apart from each other by a suitable distance in the longitudinal direction, a plurality of second shift devices generally indicated by 114 in FIG. 9, and a stopper 113 whose stopping surface is perpendicular to the longitudinal axis of the pipe inspection device.

Each roller 112 is carried by a shaft 111 which in turn is supported by stands 110 and is drivingly coupled to a motor $M_1$ (See FIG. 9). Each second shift device comprises a second shift arm 114 whose base is pivoted to the stand 110, and an air cylinder 115 operatively coupled through a linkage 116 to the second shift arm 114 so that when the piston rod of the air cylinder 115 is extended, the second shift arm 114 may be displaced transversely in a plane perpendicular to the longitudinal axis of the pipe inspection device, as indicated by the arrow in FIG. 10. The upper side of the second shift arm 114 is connected or recessed downwardly so as to receive therein the pipe.

The pipe clamping device $B_1$ is substantially similar in construction to the pipe clamping device B described in detail with reference to FIG. 5 so that no further description thereof shall be made in this specification.

The pipe positioning device $B_2$ of the second embodiment comprises a stand-type carriage (the right end in FIG. 9) and at least one transfer carriage 122. The transfer carriages 122 in FIG. 9 ride on two rails 121 laid in parallel with the longitudinal axis of the pipe inspection device and are moved in the directions indicated by the arrows in FIG. 9, and the distance therebetween may be changed depending upon the length of a pipe to be inspected. The upper sides of the front and rear frames of each carriage 122 are recessed in the form of a letter V as indicated by 123 in FIG. 10.

Each carriage 122 includes a third shift device comprising a third shift arm 124 whose base is carried by a shaft 126 and an air cylinder 125 whose piston rod is connected to the third shift arm 124 at the midpoint between its base and free end so that when the air cylinder 125 is actuated to extend its piston rod, the third shift arm 124 is rotated about the shaft 126 in the clockwise direction in a plane transverse to the longitudinal axis of the pipe inspection device as indicated by the broken lines in FIG. 10. The upper side of the third shift arm 124 has a recess which completely coincides with the V-shaped recess 123 of the front or rear frame of the carriage 122 when the third shift arm 124 is in the inoperative or lowered position as indicated by the solid lines in FIG. 10.

Next referring to FIGS. 9, 11 and 12, the gage recovery box $F_1$ will be described. The gage recovery box $F_1$ comprises a carriage 127 which rides on the rails 121, a stopper plate 128 erected upright on the carriage 127, an approach roller assembly 129 which consists of a plurality of rollers and is mounted on the carriage 127 horizontally and upon which is ejected the gage D as indicated by the broken lines in FIG. 12 and a transfer roller assembly 131 which is mounted on the carriage 127 rearwardly of the approach roller assembly 129 and in coplanar relation therewith (See FIG. 12) so that the ejected gage D may be smoothly moved over the transfer roller assembly 131 from the approach roller assembly 129. The transfer roller assembly 131 is so operatively coupled throgh a linkage 133 to an air cylinder 130 that it may be tilted about the axis in parallel with the longitudinal axis of the pipe inspection device until the upper surface of the transfer roller assembly 131 becomes coplanar with the upper surface of a chute 135 as indicated by the broken lines in FIG. 11. The gage recovery box $F_1$ further includes a cover 132 having a dumper door 134 which is hinged to the cover 132 and is operatively coupled through the linkage 133 to the air cylinder 130 so that the dumper door 134 may be swung open outwardly as indicated by the broken lines and the arrow in FIG. 11 in synchronism with the tilting movement of the transfer roller assembly 131.

Figure 11:
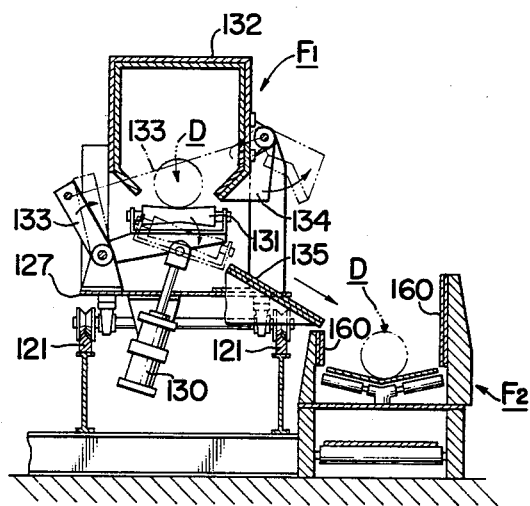
FIG. 11 is a side view, partly in section, looking into the direction indicated by the arrows XI—XI of FIG. 9.
Figure 12:
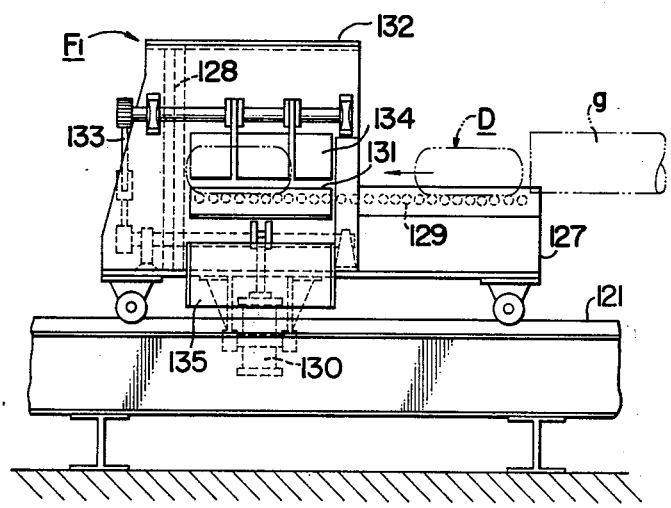
FIG. 12 is a front view looking into the direction indicated by the arrows XII—XII of FIG. 9.

Next referring to FIGS. 9 and 11, the gage conveyor system $F_2$, which is of the V-belt type, is disposed along the other side of the inspection device (that is, on the side opposite to that along which are disposed the pipe transfer device $A_1$ and the pipe end aligning device $A_2$), and has a length slightly longer than the distance between the stopper 113 of the pipe end aligning device $A_2$ and the stopper plate 128 on the carriage 127 when the latter is moved to the leftmost end on the rails 121 in FIG. 9. As shown in FIG. 11, the conveyor passage is defined by a conveyor belt and skirt walls 160.

Figure 13:
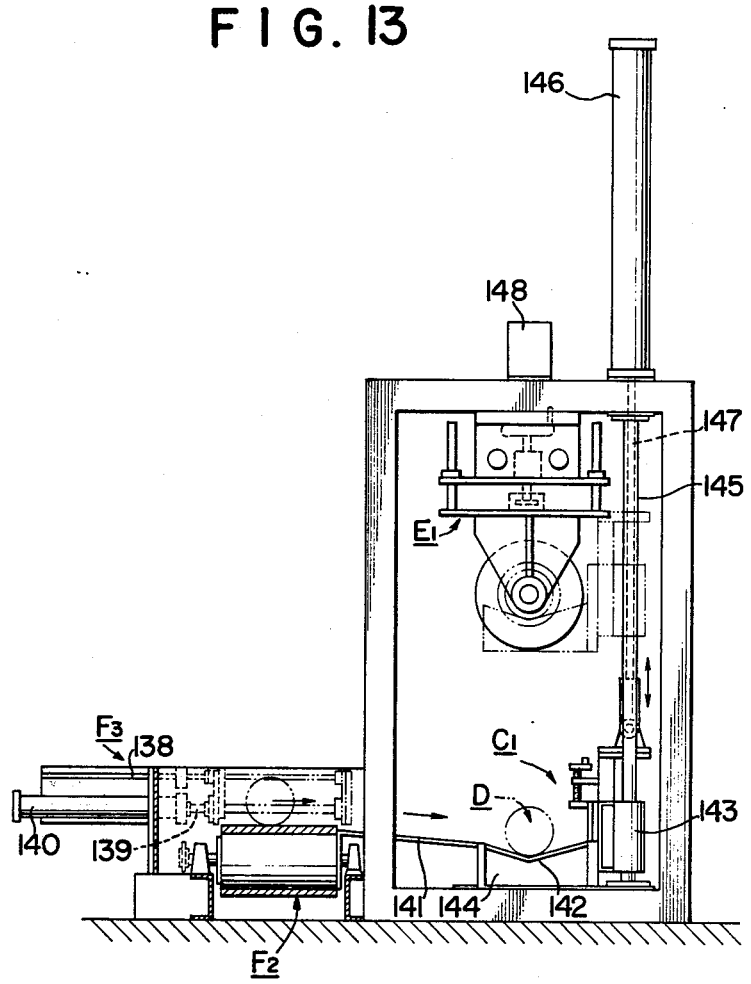
FIG. 13 is a side view looking into the direction indicated by the arrows XIII—XIII of FIG. 9.

The gage conveyor system $F_2$ includes the discharge device $F_3$ disposed at the discharge end (the right end in FIG. 9) for discharging the gage D onto the gage positioning device $C_1$. As best shown in FIGS. 9 and 13, the discharge device $F_3$ comprises a stopper 137 positioned upwardly of the conveyor belt at the discharge end of the conveyor system $F_2$, an air cylinder 140 whose piston rod 139 is guided along a guide 138 which is disposed upwardly the conveyor belt of the conveyor system $F_2$ and is extended transversely of the conveyor belt on the left side of the stopper 137, and a chute 141 which is extended between the upper surface of the conveyor belt and the gage positioning device $C_1$ as best shown in FIG. 13 so that when the piston rod 139 of the air cylinder 140 is extended to push the gage D in the transverse direction, the gage D may roll down over the chute 141 into the gage positioning device $C_1$ as indicated by the broken line circle in FIG. 13.

Next still referring to FIG. 13, the gage positioning device $C_1$ comprises a block 144 having a V-shaped groove 142 and being mounted or attached to a block holder 143, which is attached to the lower end of a piston rod 147 of a vertical air cylinder 146, the cylinder rod 147 being guided by a guide 145 in its vertical movement. Therefore the block 144 is movable between the first or lower position indicated by the solid lines in FIG. 13 of receiving the gage D discharged out of the conveyor system $F_2$ by the gage discharge device $F_3$ and the second or raised position indicated by the broken lines in FIG. 13. At the second or raised position the axis of the gage D held on the V-block 144 coincides with the axis of the pipe g held in the inspection position by the clamping device $B_1$ and the pipe positioning device $B_2$.

Still referring to FIGS. 9 and 13, the gage injecting or firing device $E_1$ comprises an air nozzle substantially similar in configuration to that shown in FIG. 4. The air nozzle has a reduced-diameter section 149 and a tapered section 150 corresponding to the sections 17 and 18, respectively of the air nozzle shown in FIG. 4, and is operatively coupled to an air cylinder 148 (See FIG. 13) so that the air nozzle may be movable toward or away from the end of the gage D in the firing position (See FIG. 9). The air nozzle is further so arranged and operatively coupled to a handwheel that it may be also vertically movable.

The devices described above are operatively coupled to suitable power sources (not shown), and are sequentially operated for a predetermined time interval in accordance with a program in response to various control or command signals from an electrical control circuit which is well known so that no description shall be made.

Next the mode of operation of the second embodiment with the above construction will be described in detail hereinafter. The pipe g to be inspected is transported by a suitable pipe conveyor system (not shown), transferred onto the transfer stands 101 of the pipe transfer device $A_1$, and stopped by the stoppers 104. The position of the stoppers 104 may be displaced in the transverse direction by rotating the handlewheel 105 so that in the first shift step the first shift arms 109 may shift only one pipe onto the rollers 112 of the pipe end aligning device $A_2$ as shown in FIG. 10. In other words, the position of the stoppers 104 is dependent upon the diameter of the pipe to be inspected. To lift the pipe g and transfer it over the rollers 112 of the pipe end aligning device $A_2$, the air cylinder 108 is energized to extend its piston rod so that the first shift arms 109 are rotated about the shafts 107 in the clockwise direction in FIG. 10. Therefore, the pipe is lifted past the stoppers 104 and the stepped portion 103 over the downwardly inwardly inclined upper surface of the stand 101. Consequently the pipe rolls down onto the rollers 112 and rests thereupon in parallel with the axis of the inspection device. Thereafter the driving motor $M_1$ is energized to drive the rollers 112 in such a way that one end (the right end in FIG. 9) of the pipe is brought into contact with the stopper 113, and then the motor $M_1$ is de-energized. Next the air cylinder 115 is actuated so that the second shift arm 114 is rotated in the clockwise direction about its axis and consequently the pipe on the rollers 112 is transferred to the pipe positioning device $B_2$ and received in the V-grooves 123. Thereafter the pipe clamping device $B_1$ is actuated to clamp the pipe securely in position. The distance between the carriages 122 of the pipe positioning device $B_2$ is predetermined depending upon the length of the pipe to be inspected, and the carriage 127 of the gage recovery box $F_1$ is so located that the gage D discharged out of the other end of the pipe may safely land on the approach roller assembly 129. That is, as shown in FIG. 12 the other end of the pipe g is slightly inserted into the approach roller assembly 129. The pipe is then surely clamped by the chuck mechanism of the pipe clamping device $B_1$.

Meanwhile the vertical air cylinder 146 is actuated to retract its piston rod 147 so that the block 144 upon which is placed the gage D is lifted to the upper position indicated by the broken lines in FIG. 13 and consequently the axis of the gage D is made in line with the axis of the pipe held in the inspection position in the manner described above.

Thereafter the air cylinder 148 is actuated to displace the air nozzle toward the gage D, thereby pushing the gage D into the pipe g. After the reduced-diameter section 149 is inserted into the pipe g and the tapered section 150 is made into air-tight contact with one end of the pipe g, the fluid under pressure is admitted through the air nozzle behind the gage D so that the gage D is forced to pass through the pipe toward the other end thereof in the manner described in conjunction with the first embodiment. The gage D discharged out of the other end of the pipe lands over the approach roller assembly 129 and is immediately transferred onto the transfer roller assembly 131 and stopped by the stopper plate 128 of the gate recovery box $F_1$ as shown in FIG. 12. Therefore the gage D may be prevented from striking against the pipe positioning device $B_2$ or the like and rebounding therefrom. Consequently the operators may be positively prevented from being hit and injured by the flying gage D, and the gage D itself may be prevented from being deformed or damaged so that the longer service life of the gage may be ensured.

When the gage D is trapped in the gage recovery box $F_1$, the air cylinder 130 is actuated so that the transfer roller assembly 131 is tilted as shown in FIG. 11 while the dumper door 134 is swung opened so that the gage D slides over the chute 135 onto the conveyor belt of the conveyor system $F_2$ as shown in FIG. 11. The jumping over the conveyor passage of the gage D dischaged from the gage recovery box $F_1$ is positively prevented by the skirt wall 160.

Thereafter the conveyor system $F_2$ is driven to return the gage D back to the gage positioning device $C_1$. At the discharge end of the conveyor system $F_2$ the gage D is stopped by the stopper 137, and then the air cylinder 140 of the gage discharge device $F_3$ is actuated so that its piston rod 139 is extended to push the gage D transversely toward the chute 141 and consequently the gage D rolls over the chute 141 down into the V-shaped groove 142 of the block 144 of the gage positioning device $C_1$ as best shown in FIG. 13. Thus the gage D is returned to its initial position, and may be fired for inspection of the next pipe in the same manner described above. Therefore according to the second embodiment in accordance with the present invention, not only the manual recovery of the discharged gage may be eliminated but also the arrangement of two similar pipe inspection devices for charging the gage discharged out of one of the pipe inspection devices into the other may be eliminated. The gage is automatically recovered and returned to its initial position.

After the gage D has been discharged out of the other end of the pipe g, the pipe clamping device $B_1$ is de-energized to release the inspected pipe and then the air cylinder 125 of the third shift device is actuated so that the third shift arm 124 is rotated in the clockwise direction about the shaft 126 as indicated by the dotted lines in FIG. 10 and consequently the inspected pipe g is transferred to the discharge stand or the like in the direction indicated by the arrow in FIG. 10.

When the gage D fired cannot pass through the pipe because it is caught by the inner wall of the pipe, both the pipe and the gage must be rejected.

With the second embodiment, even though the pipes to be inspected are varied in length and inner diameter, the automatic inspection of their inner diameter and bending may be carried out. The injuries to the operators by the flying gage may be eliminated, and the wear and abrasion of the gage may be minimized. Furthermore the labor saving may be realized and the quick and safeguard inspection may be ensured regardless of the degree of skills of inspectors.

It is to be understood that the present invention is not limited to the first and second embodiments described above, and that various modifications may be effected without departing the scope of the present invention. For instance, the pipe transfer device $A_1$ has been so far described as transferring the pipes one by one to the pipe end aligning device $A_2$, but it may be so arranged as to transfer a plurality of pipes simultaneously. The pipe end aligning device may incorporate a pusher or the like for pushing back the pipe so that one end of the pipe may be aligned with the leading end of the gage D on the gage positioning device $C_1$. Instead of the pneumatically driven pipe clamping device $B_1$, an electromagnetically driven chuck or the like may be used. Instead of the carriages of the pipe positioning device $B_2$, any other suitable driving systems such as a rack and pinion, screw shaft or cylinder type driving system may be employed so that the pipe positioning device may be moved along the rails or guides in either direction. Instead of the approach roller assembly 129, a belt conveyor system may be used. Instead of the tiltable transfer roller assembly in the gage recovery box $F_1$, any other suitable transfer means may be used. For instance, it may be of the type utilizing an electromagnet for causing the transverse displacement of the trapped gage onto the conveyor belt, the type in which the discharged gage is transversely displaced and then dropped onto the conveyor belt or the type in which inclined guide rods are provided to transfer the discharged gage onto the conveyor belt. In the gage discharging device, instead of the pneumatic system, an electromagnetic system may be employed which may eliminate the use of the skirt wall 160. Instead of the conveyor system $F_2$ of the type described, any other suitable conveyor system may be employed. For instance, it may be of the chain conveyor type, or the gravity conveyor type or a crane. In the gage positioning device $C_1$, an inclined lifting conveyor system or electromagnetic system for causing the transverse displacement of the gage may be employed. The air nozzle of the gage firing device $E_1$ may be of any suitable shape as far as it is capable of inserting the gage into the pipe to be inspected and firing it therethrough. As the fluid under pressure the compressed air or a suitable soluble oil or the like under pressure may be used to fire the gage through the pipe, and a suitable hydraulic system may be incorporated in order to recirculate this oil. Instead of the rack-and-pinion or pneumatic driving system for the air nozzle, any other suitable driving systems such as a screw or carriage type may be employed.

As described above, the present invention may provide commercially and technologically very remarkable features and advantages.

What is claimed is:

1. A pipe inspection device for inspecting the inner diameter and bending of a pipe by forcing a gauge through the pipe from one end thereof to the other end under the driving force of fluid under pressure, said device comprising
    a stopper means swingably movable about an axis into and out of its pipe positioning position,
    means for moving said stopper means about said axis, pipe positioning means including a plurality of rollers, adjacent said stopper means which are driven to displace the pipe placed thereupon so as to bring the pipe into a predetermined inspection position in which one end of the pipe is brought into engagement with said stopper means, pipe clamping means for clamping securely the pipe in said predetermined inspection position, a gauge placed on a gauge positioning means near one end of the pipe gauge firing means including
  nozzle means for emitting fluid under pressure mounted for movement toward or away from one end of the pipe in said predetermined inspection position,
  said movement of said nozzle means being coaxial of the pipe in said predetermined inspection position, said nozzle means having such a longitudinal cross sectional configuration that when it moves toward said one end of the pipe, it may insert into the pipe said gauge placed on said gauge positioning means and when it is further moved, it may be brought into fluid-tight contact with said one end of the pipe, whereby the fluid under pressure may be admitted through said nozzle means behind said gauge in the pipe, thereby forcing said gauge through the pipe toward the other end thereof, and stopper plate means disposed adjacent to the other end of the pipe in said predetermined inspection position for stopping said gauge discharged out of the other end of the pipe and preventing further flying of said gauge beyond said stopper plate means.

2. A pipe inspection device as set forth in claim 1 further comprising a gauge recovery means comprising
  a tiltable roller assembly which comprises a plurality of rollers and which is tiltable about an axis in parallel with the axis of the pipe in said predetermined inspection position and which is disposed between said stopper plate means and the other end of the pipe in said predetermined inspection position,
a belt conveyor means extended along one side of the pipe inspection device beyond both ends of the pipe in said inspection position over a distance at least longer than the maximum length of the pipes to be inspected,
said tiltable roller assembly including means for tilting said assembly downwardly toward said belt conveyor means,
guide means interposed between said tiltable roller assembly and said belt conveyor means, and
gauge discharge means disposed at the discharge end of said belt conveyor means for receiving said gauge therefrom and discharging said gauge onto said gauge positioning means whereby when the gauge is discharged out of the other end of the pipe and lands over said tiltable roller assembly and strikes against and is stopped by said stopper plate means to rest on said tiltable roller assembly and upon tilting of said tiltable roller assembly said gauge is discharged over said guide means onto said belt conveyor means, transported by said belt conveyor means to said discharge end thereof and discharged by said discharge means onto said gauge positioning means.

3. A pipe inspection device as set forth in claim 1 wherein
said gauge positioning means comprises
  substantially upright guide rod means,
  holder means vertically slidably movable along said guide rod means,
  gauge supporting block means mounted on said holder means and provided with an upper surface V-shaped in cross section for receiving said gauge and aligning said gauge with the axis of the pipe in said predetermined inspection position, and means for vertically moving said holder means wherein said block means with said gauge supported on the upper surface thereof is moved vertically upward to a raised position in which the axis of said gauge on said block means coincides with the axis of said pipe in said predetermined inspection position.

4. A pipe inspection device as set forth in claim 1 wherein said pipe clamping means comprises
  two toothed wheels or gears carried by separate rotary shafts, respectively, and in mesh with each other,
  arm lever means one end of which is securely fixed to one of said rotary shafts,
  actuating cylinder means including a piston rod which is pivoted to the other end of said arm lever means, and
  a pair of clamping arms carried by said rotary shafts, respectively, and positioned to engage the pipe in said predetermined position whereby when said piston rod of said actuating cylinder means is extended or retracted, said gears and hence said rotary shafts are rotated in opposite directions, respectively, and consequently said clamping arms are caused to move toward or away from each other, thereby clamping the pipe therebetween or releasing the pipe therefrom.

5. A pipe inspection device as set forth in claim 1 further comprising
pipe transfer means disposed along one side of the pipe inspection device, said pipe transfer means comprising
  a plurality of stands spaced apart from each other by a suitable distance in the longitudinal direction of the pipe inspection device along the one side thereof,
  each stand having an outer lower rolling surface inclined downwardly and inwardly, an inner upper rolling surface also inclined downwardly and inwardly and a stepped portion inclined upwardly for interconnecting between said outer lower rolling surface and said inner upper rolling surface,
  each stand including first shift arm means rotatable about an axis parallel to the longitudinal axis of the pipe inspection device for transferring a pipe placed on said outer lower rolling surface over said stepped portion and onto said inner upper rolling surface.

6. A pipe inspection device as set forth in claim 1, wherein said pipe positioning means and said pipe clamping means are arrayed along the longitudinal axis of the pipe inspection device in the operative position in which the pipe is clamped in said predetermined inspection position.

7. A pipe inspection device for inspecting the inner diameter and bending of a pipe by forcing a gauge through the pipe from one end thereof to the other end under the driving force of fluid under pressure, said device comprising a fixed stopper means, pipe positioning means including a plurality of rollers, adjacent said stopper means which are driven to displace the pipe placed thereupon so as to bring the pipe into a predetermined position in which one end of the pipe is brought into engagement with said stopper means, carriage means including at least two carriages having a plurality of wheels and a pair of guide rails, said carriages being movable on said guide rails in either direction of the longitudinal axis of the pipe to be adjustable depending upon the length of the pipe, pipe clamping means for clamping securely the pipe in a predetermined inspection position, said pipe clamping means being mounted on said carriage means, shift means having at least one shift arm displaced transversely in a plane perpendicular to the longitudinal axis of the pipe on said pipe positioning means and cross feeding the pipe to said predetermined inspection position, a gauge placed on a gauge positioning means near one end of the pipe, gauge firing means including nozzle means for emitting fluid under pressure mounted for movement toward or away from one end of the pipe clamped by said clamping means on said carriage means, said nozzle means having such a longitudinal cross sectional configuration that when it moves toward said one end of the pipe, it may insert into the pipe said gauge placed on said gauge positioning means and when it is further moved, it may be brought into fluid-tight contact with said one end of the pipe, whereby the fluid under pressure may be admitted through said nozzle means behind said gauge in the pipe, thereby forcing said gauge through the pipe toward the other end thereof, and stopper plate means disposed adjacent to the other end of the pipe in said predetermined inspection position for stopping said gauge discharged out of the other end of the pipe and preventing further flying of said gauge beyond said stopper plate means.

8. A pipe inspection device as set forth in claim 7, wherein said pipe positioning means and said pipe clamping means are disposed in side by side relation.

9. A pipe inspection device as set forth in claim 7 wherein said stopper plate means is mounted on a carriage which rides on said rails of said carriage means in and includes an approach roller assembly mounted on said carriage between said stopper plate means and one end of said carriage located closer to the other end of said pipe when said carriage is located in the operative position so that said gauge discharged out of the other end of the pipe lands on said approach roller assembly and slides thereover toward said stopper plate means.

* * * * *